(12) United States Patent
Hamada et al.

(10) Patent No.: US 7,996,044 B2
(45) Date of Patent: Aug. 9, 2011

(54) MOBILE COMMUNICATION DEVICE AND APPLICATION EXECUTION ENVIRONMENT SOFTWARE FOR MOBILE COMMUNICATION DEVICE

(75) Inventors: Yuki Hamada, Beijing (CN); Kaoru Hagiwara, Tokyo (JP)

(73) Assignee: Access Co., Ltd., Chiyoda-ku, Tokyo (JP)

( * ) Notice: Subject to any disclaimer, the term of this patent is extended or adjusted under 35 U.S.C. 154(b) by 1159 days.

(21) Appl. No.: 11/664,195

(22) PCT Filed: Sep. 22, 2005

(86) PCT No.: PCT/JP2005/017456
§ 371 (c)(1),
(2), (4) Date: Mar. 28, 2007

(87) PCT Pub. No.: WO2006/035658
PCT Pub. Date: Apr. 6, 2006

(65) Prior Publication Data
US 2008/0125179 A1    May 29, 2008

(30) Foreign Application Priority Data

Sep. 29, 2004  (JP) ................................. 2004-283676

(51) Int. Cl.
*H04M 1/00*   (2006.01)
(52) U.S. Cl. ..... 455/566; 455/418; 455/419; 455/575.3; 455/557; 455/466
(58) Field of Classification Search .................. 455/566, 455/518, 557, 418–419, 550.1, 575.3, 412.1
See application file for complete search history.

(56) References Cited

U.S. PATENT DOCUMENTS

| 7,092,703 B1 * | 8/2006 | Papineau ....................... 455/418 |
| 7,248,895 B2 * | 7/2007 | Shiraogawa et al. ......... 455/557 |
| 2001/0041593 A1 | 11/2001 | Asada |

(Continued)

FOREIGN PATENT DOCUMENTS

CN    1323147 A    11/2001

(Continued)

OTHER PUBLICATIONS

Notification of Reasons of Rejection issued in corresponding Japanese Patent Application No. 2006-537695 along with the English translation thereof.

(Continued)

*Primary Examiner* — Charles N. Appiah
*Assistant Examiner* — Michael T Vu
(74) *Attorney, Agent, or Firm* — Morrison & Foerster LLP

(57) ABSTRACT

There is provided a mobile communication device comprising an environment as a mobile communication device platform and an application execution environment configured on the mobile communication device platform. The application execution environment has a function of a first software interface, for receiving an operation regarding a wallpaper setting which is used by a wallpaper setting program as a default application operating on the mobile communication device platform, for a user setting application operating on the application execution environment. The mobile communication device platform has a function of a second software interface, for receiving an operation regarding the wallpaper setting which is used by the wallpaper setting program, for the application execution environment. An instruction for an operation regarding the wallpaper setting issued from the user setting application is reflected in the wallpaper setting via the first software interface and the second software interface.

21 Claims, 3 Drawing Sheets

U.S. PATENT DOCUMENTS

| | | |
|---|---|---|
| 2002/0123368 A1 | 9/2002 | Yamadera et al. |
| 2005/0054372 A1 | 3/2005 | Tsuda et al. |

FOREIGN PATENT DOCUMENTS

| | | |
|---|---|---|
| EP | 1098457 | 9/2001 |
| JP | 2002261918 | 9/2002 |
| JP | 2003169372 | 6/2003 |
| JP | 2003174406 | 6/2003 |
| JP | 2003309880 | 10/2003 |
| JP | 2003333137 | 11/2003 |
| JP | 2004007144 | 1/2004 |
| WO | WO-0070794 | 11/2000 |

OTHER PUBLICATIONS

Office Action Issued by the State Intellectual Property Office of the People's Republic of China in related Chinese Application No. 200580033104.1 on Mar. 16, 2010, 3 pages (English translation attached, 4 pages).

* cited by examiner (a)     (b)     (c)

MOBILE COMMUNICATION DEVICE AND APPLICATION EXECUTION ENVIRONMENT SOFTWARE FOR MOBILE COMMUNICATION DEVICE

TECHNICAL FIELD

The present invention relates to a mobile communication device, and in particular, to the configuration of an application program execution environment which operates on the mobile communication device.

BACKGROUND OF THE INVENTION

New types of devices equipped with specific application execution environments are being provided in recent years even in the field of mobile communication devices like mobile phones and PHS's. For example, for a mobile phone equipped with a Java® execution environment, the application developer designs a Java application program by use of various class library groups, etc. which are configured on the Java virtual machine. Incidentally, a standard called "MIDP" (Mobile Information Device Profile) has been proposed as one of such Java environments provided for mobile phones, and an application configured on MIDP is sometimes called a "MIDlet".

In Japanese Patent Provisional Publication No. 2003-169372, a configuration for modifying an application operating on a mobile phone into a call-notifying type has been described. An application of the call-notifying type is controlled to display information indicating an incoming call on the display screen when there is an incoming call during the execution of the application. In the publication, it is described that interruption of the application due to an incoming call, etc. can be prevented by such control.

DISCLOSURE OF THE INVENTION

Programs operating on a mobile communication device include a program for executing the original functions of the mobile communication device (telephone call function, email function, etc.) and programs operating according to settings by the user (the so-called "application programs"). In this specification, the program executing the original functions of the mobile communication device will be referred to as a "default application", while the programs operating according to settings by the user will be referred to as "user setting applications". The aforementioned MIDlet is one of the user setting applications.

Each user setting application operates in a particular application execution environment like Java. The user setting applications can be placed as applications that can be downloaded and run even after the purchase of the mobile communication device. Meanwhile, the default application can be placed as an application that is prepared by the vendor of the mobile communication device by configuring it directly on the platform of the mobile communication device or configuring it as a part of the platform.

The so-called "standby application", for displaying video during the standby state in which the mobile communication device is on standby for an incoming call, is one of the user setting applications. The default application and a user setting application generally operate in the following relationship. For example, the standby application operates during the standby state and the default application is activated in response to an incoming call. After the activation of the default application, the display screen is controlled according to settings by the default application while the standby application stays in a substantially stopped state.

The above conventional relationship between the default application and the user setting application involves the following disadvantage. When there is an incoming call, etc., the display content on the screen changes from that set by the user setting application to that set by the default application since the user setting application pauses and the default application goes into operation. Thus, from the viewpoint of the display content of the user setting application, relevance of display content can not be maintained when there is an incoming call, etc. It is desirable that the relevance of display content to the user setting application be maintained even when the default application is activated.

The default application goes into operation not only when such an external event (incoming call, etc.) occurs but also when the user setting application shifts into the substantially stopped state for electric power saving. Also in such cases, the display content on the screen changes from the user setting application to the default application and the relevance of display content can not be maintained.

The present invention has been made in consideration of the above problems. It is therefore the primary object of the present invention to provide a mobile communication device and application execution environment software for the mobile communication device that are capable of allowing the content on the display screen to be relevant to a user setting application that operated till the activation of the default application even when the default application is activated in the mobile communication device due to an incoming call, electric power saving, etc.

In order to achieve the above object, in accordance with an aspect of the present invention, there is provided a mobile communication device comprising an environment as a mobile communication device platform and an application execution environment configured on the mobile communication device platform. The application execution environment has a function of a first software interface, for receiving an operation regarding a wallpaper setting which is used by a wallpaper setting program as a default application operating on the mobile communication device platform, for a user setting application operating on the application execution environment. The mobile communication device platform has a function of a second software interface, for receiving an operation regarding the wallpaper setting which is used by the wallpaper setting program, for the application execution environment. An instruction for an operation regarding the wallpaper setting issued from the user setting application is reflected in the wallpaper setting via the first software interface and the second software interface.

With such a configuration, the user setting application can change the setting on the wallpaper setting program's side (default application's side). Therefore, an image intended by the creator of the user setting application can be continuously displayed on the screen even when the user setting application stops its operation due to an incoming telephone call, electric power saving, etc.

The application execution environment may have a function of shifting the user setting application among an active state, a paused state and an ended state, and the application execution environment may shift the user setting application from the active state to the paused state when a notification generated upon occurrence of an external event such as an incoming call is received from the mobile communication device platform.

The application execution environment may have a function of shifting the user setting application among an active state, a paused state and an ended state, and the application execution environment may shift the user setting application from the active state to the paused state when a notification is received from the user setting application for electric power saving.

The instruction for the operation regarding the wallpaper setting may be issued from the user setting application when the user setting application is in the active state.

At least one selected from the mobile communication device platform and the application execution environment may further have a function of saving the wallpaper setting before a change when the wallpaper setting is changed by an operation from the user setting application.

In accordance with another aspect of the present invention, there is provided a mobile communication device comprising an application execution environment. The application execution environment has a function of providing a user setting application operating on the application execution environment with a software interface to be used for performing an operation regarding a wallpaper setting which is used by a wallpaper setting program as a default application operating on the mobile communication device.

With such a configuration, the user setting application can change the setting on the wallpaper setting program's side (default application's side). Therefore, an image intended by the creator of the user setting application can be continuously displayed on the screen even when the user setting application stops its operation due to an incoming telephone call, electric power saving, etc.

The application execution environment may further have a function of saving the wallpaper setting before a change when the wallpaper setting is changed by an operation from the user setting application.

In the above two aspects of the present invention, the wallpaper setting may include a setting regarding registration and overwriting of an image file which is displayed as a wallpaper.

Further, the wallpaper setting includes a setting for specifying which of image files registered as wallpapers should be displayed as the wallpaper.

In order to achieve the above object, in accordance with another aspect of the present invention, there is provided execution environment software comprising an environment as a mobile communication device platform constructed on a mobile communication device and an application execution environment configured on the mobile communication device platform. The application execution environment has a function of a first software interface, for receiving an operation regarding a wallpaper setting which is used by a wallpaper setting program as a default application operating on the mobile communication device platform, for a user setting application operating on the application execution environment. The mobile communication device platform has a function of a second software interface, for receiving an operation regarding the wallpaper setting which is used by the wallpaper setting program, for the application execution environment. An instruction for an operation regarding the wallpaper setting issued from the user setting application is reflected in the wallpaper setting via the first software interface and the second software interface.

With such a configuration, the user setting application can change the setting on the wallpaper setting program's side (default application's side). Therefore, an image intended by the creator of the user setting application can be continuously displayed on the screen even when the user setting application stops its operation due to an incoming telephone call, electric power saving, etc.

In order to achieve the above object, in accordance with another aspect of the present invention, there is provided software as an application execution environment operating on a mobile communication device platform constructed on a mobile communication device. The application execution environment has a function of a software interface, for receiving an operation regarding a wallpaper setting which is used by a wallpaper setting program as a default application operating on the mobile communication device platform, for a user setting application operating on the application execution environment. The application execution environment makes a request to the mobile communication device platform so that the received operation regarding the wallpaper setting is reflected in the wallpaper setting.

With such a configuration, the user setting application can change the setting on the wallpaper setting program's side (default application's side). Therefore, an image intended by the creator of the user setting application can be continuously displayed on the screen even when the user setting application stops its operation due to an incoming telephone call, electric power saving, etc.

BRIEF DESCRIPTION OF THE DRAWINGS

FIG. 4 is a schematic diagram showing changes in screen display caused by state transitions of the user setting application, wherein FIG. 4(a) shows a case where the user setting application has not been activated, FIG. 4(b) shows a case where the user setting application is in an active state, and FIG. 4(c) shows a case where the user setting application has shifted into a pause state.

BEST MODE FOR CARRYING OUT THE INVENTION

Figure 1:
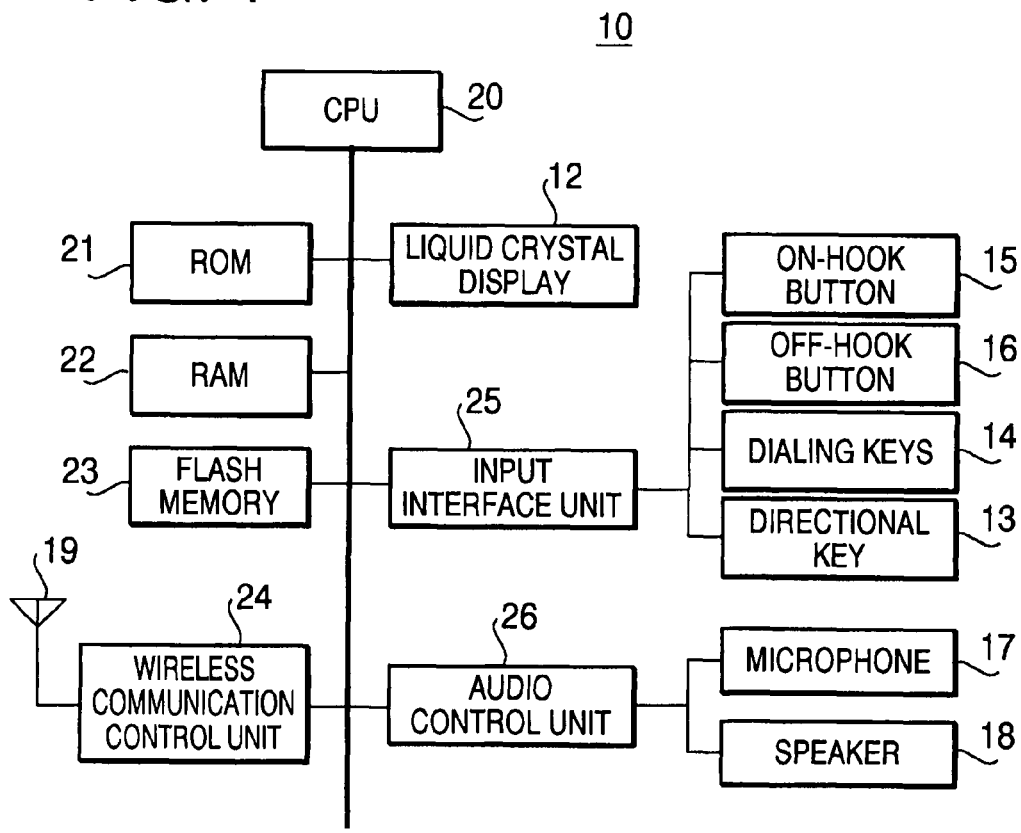
FIG. 1 is a block diagram showing the composition of a mobile phone terminal having an application execution environment.

In the following, a mobile communication device in accordance with an embodiment of the present invention will be described. The mobile communication device explained below is equipped with an application execution environment. FIG. 1 is a block diagram showing the composition of a mobile phone terminal 10 having the application execution environment. The mobile phone terminal 10 includes a CPU 20 for controlling the whole of the terminal. The CPU 20 is connected with a ROM 21, a RAM 22, a flash memory 23, a wireless communication control unit 24, a liquid crystal display 12, an input interface 25 and an audio control unit 26. An antenna 19 is connected to the wireless communication control unit 24. Various keys such as a directional key 13, dialing keys 14, an on-hook button 15 and an off-hook button 16 are connected to the input interface unit 25. A microphone 17 and a speaker 18 are connected to the audio control unit 26.

The ROM 21 is a nonvolatile read-only memory storing various programs to be executed by the CPU 20 and fixed data. The RAM 22 is a rewritable memory which provides the CPU 20 with work areas and temporary data storage areas. The flash memory 23 is a rewritable memory which nonvolatilely stores additional application programs and various data. The wireless communication control unit 24 executes wireless voice/data communication (transmission and reception) with base stations via the antenna 19. The liquid crystal display 12 forms a display unit having a display screen. The input interface unit 25 receives input operations of the user through the dialing buttons 14 and the directional key 12 of an operation unit of the mobile phone terminal 10. The audio control unit 26 controls the input and output of sound via the microphone 17 and the speaker 18.

A storage unit for storing a default program (for implementing the original functions of the mobile phone terminal such as telephone calls and mail transmission/reception), an OS (Operating System), a program of a Java execution environment, a Java application program, etc. is formed by the ROM 5 and the flash memory 23.

Figure 2:
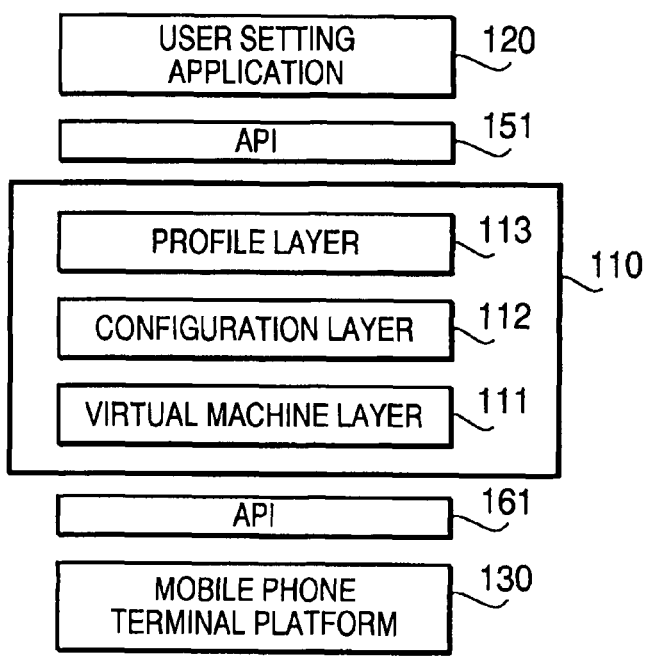
FIG. 2 is a schematic diagram showing the general composition of a Java execution environment which is configured in the mobile phone terminal.

FIG. 2 is a schematic diagram showing the general composition of the Java execution environment 110 which is configured in the mobile phone terminal 10. FIG. 2 also shows the relationship among the Java execution environment 110, a mobile phone terminal platform 130 (implemented by hardware of the mobile phone terminal 10, the OS, etc.) and a user setting application 120 (i.e. the Java application).

As shown in FIG. 2, the Java execution environment 110 includes a virtual machine layer 111, a configuration layer 112 and a profile layer 113. An example of the Java execution environment 110 shown in FIG. 2 is J2ME (Java 2 Platform Micro Edition) targeted for embedded devices. The virtual machine layer 111 is a layer implementing the Java virtual machine. An example of the virtual machine layer 111 is KVM (K Virtual Machine). The configuration layer 112 provides a class library corresponding to the virtual machine. The J2ME defines CDLC (Connected Limited Device Configuration), etc. The profile layer 113 provides a class library corresponding to the type of the device. The profile layer 113 includes MIDP (Mobile Information Device Profile) designed for mobile terminals, for example.

The user setting application 120 uses the class libraries in the Java execution environment 110 via a class library application interface 151 (hereinafter referred to as a "class library API 151"). The Java execution environment 110 uses libraries, etc. in the mobile phone terminal platform 130 via a platform interface 161 (hereinafter referred to as a "platform API 161"). An interface which is used by the mobile phone terminal platform 130 for reporting external events to an event control function of the Java execution environment 110 is provided as a function of the platform API 161.

Next, the operation of a standby application program (hereinafter referred to as a "standby application"), as an example of the user setting application (Java application) operating on the Java execution environment 110, will be explained. Here, a "standby state" means a state in which there is no user operation and the mobile phone terminal 10 is on standby for an incoming telephone call, an incoming email or an external event (e.g. short message). The standby application is an application which is automatically started up or restarted by the platform when the terminal shifts into the standby state. The standby application is assumed to be configured as an application on MIDP (hereinafter referred to as a "MIDlet"). The standby application displays video during the standby state, for example.

Figure 3:
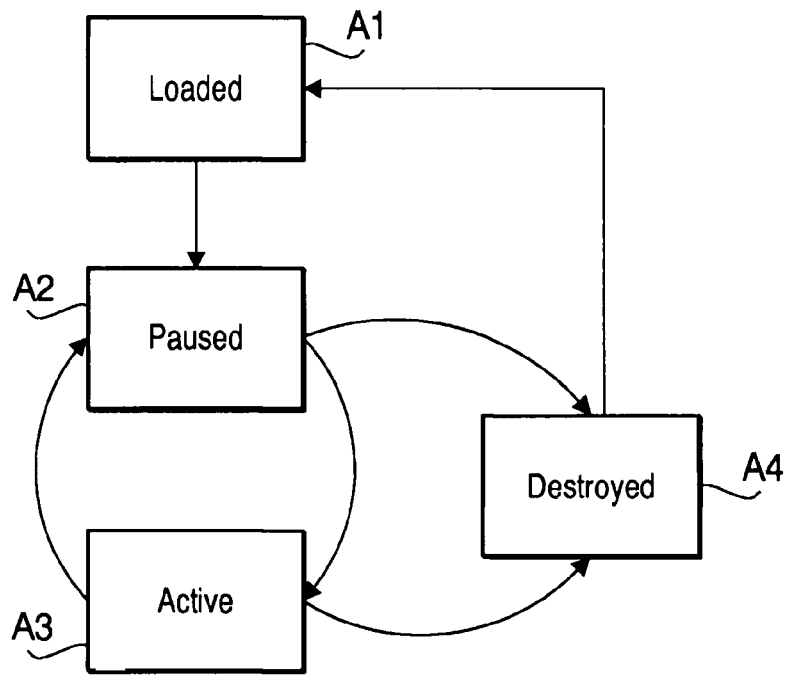
FIG. 3 is a schematic diagram showing transitions of the operating state of a user setting application.

FIG. 3 is a schematic diagram showing transitions of the operating state of the standby application. According to specifications of the MIDlet, the standby application shifts among a loaded state A1 (in which the standby application is loaded in memory), a paused state A2 (pause state with no update of screen display nor user input), an active state A3 (normal active state) and a destroyed state (ended state) A4. For example, the standby application is loaded into memory (loaded state A1) in response to a power-on operation of the mobile phone terminal 10, a user operation, etc. Via the paused state A2, the standby application shifts to the active state A3 as the normal operating state. When there is no incoming telephone call, etc. (in the so-called standby state), the standby application operates in the active state A3 (displays video on the screen).

In MIDP, state transitions of the MIDlet can be caused by external events (e.g. incoming telephone calls and incoming emails) and requests from the MIDlet. When the default application starts its operation in response to an incoming telephone call, etc., the standby application shifts into the paused state A2 (i.e. stopped state).

When the standby application is canceled by a user operation, for example, the standby application shifts into a state in which it has been ended as software (destroyed state A4).

In the mobile phone terminal 10, a "wallpaper setting program" operates as the default application. The wallpaper setting program has a setting function for setting which of registered image files should be displayed as the wallpaper. When one of the registered image files is designated by use of the wallpaper setting program, the image of the designated image file is displayed on the screen (liquid crystal display 12) as the wallpaper. When the user setting application has not been activated, a wallpaper which has been set by the wallpaper setting program is displayed on the screen.

The standby application operating on the Java execution environment 110 is capable of executing the following functions for making the wallpaper setting, as well as performing the normal operation in the so-called standby state. The standby application in the active state A3 executes a function of setting an image file (which has been generated (or acquired) by the standby application itself) as the wallpaper. Specifically, the standby application has the following two functions as the wallpaper setting function:

F1) registering an image file generated (or acquired) on the standby application's side as an image file for the wallpaper or rewriting the current wallpaper file (For example, a file name "midletwallpaper" is used for the image file of the wallpaper employed by the standby application. The wallpaper setting program recognizes the file name as that of the wallpaper set by the standby application. In cases where the midletwallpaper has already been registered, the content of the midletwallpaper can be rewritten by this function.)

F2) switching the wallpaper setting made by the wallpaper setting program to the wallpaper file used by the standby application (i.e. the midletwallpaper)

The standby application is capable of registering each image file generated by itself as one of wallpaper image files managed by the wallpaper setting program by the above function F1, and switching the wallpaper setting to the midletwallpaper by the above function F2. By such a configuration, the midletwallpaper is displayed on the screen as the wallpaper even when the standby application has shifted to the paused state A2 due to an incoming call, etc. during the operation of the standby application. The same goes for a case where the standby application has shifted to the paused state A2 for electric power saving. To sum up, an image related to the user setting application can be displayed on the screen even when the default application goes into operation.

Figure 4:
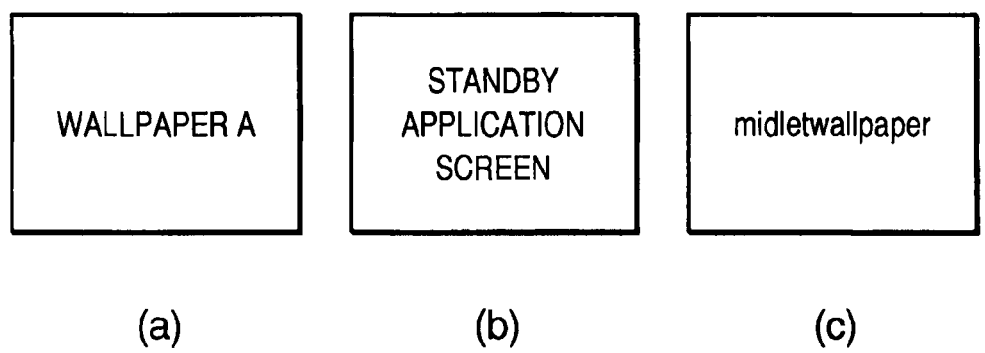

Next, the above operation of the standby application will be explained referring to FIG. 4 which shows state transitions of the display screen. In a state in which the standby application has not been activated (loaded), a wallpaper which has been set by the wallpaper setting program is displayed on the screen (see FIG. 4(a)). Subsequently, when the standby application is activated and shifts into the active state A3, display content (video) by the standby application is displayed on the screen (FIG. 4(b)). Incidentally, the standby application in the active state A3 generates an image that should be displayed when it has shifted to the paused state and changes the setting of the wallpaper setting program to the midletwallpaper by the above functions F1 and F2.

When the standby application shifts into the paused state A2 due to an incoming call, etc., the image file which has been set as the wallpaper is displayed concurrently with the activation of the default application. Since the wallpaper has been set to the midletwallpaper by the standby application as explained above, the midletwallpaper is displayed on the screen as the wallpaper during the paused state A2 of the standby application (FIG. 4(c)).

Incidentally, since the wallpaper setting can be changed by the user by calling up the wallpaper setting program, the user can make the setting change through the wallpaper setting program after canceling the standby application.

Specifically, the above functions F1 and F2 provided for the user setting application are implemented by software interfaces which are provided by the Java execution environment 110 and the mobile phone terminal platform 130 as explained below. In other words, the Java execution environment 110 provides the user setting application with a software interface which corresponds to the above functions F1 and F2. The software interface can be provided as a function of the class library API 151. Specifically, the user setting application calls up and executes a method for carrying out the above functions F1 and F2.

Meanwhile, when the Java execution environment 130 is requested by the user setting application to provide the function corresponding to the above functions F1 and F2, the Java execution environment 110 requests the mobile phone terminal platform 130 to perform an operation corresponding to the above functions F1 and F2. The mobile phone terminal platform may also be configured to receive the function corresponding to the functions F1 and F2 via the platform API 161.

Figure 5:
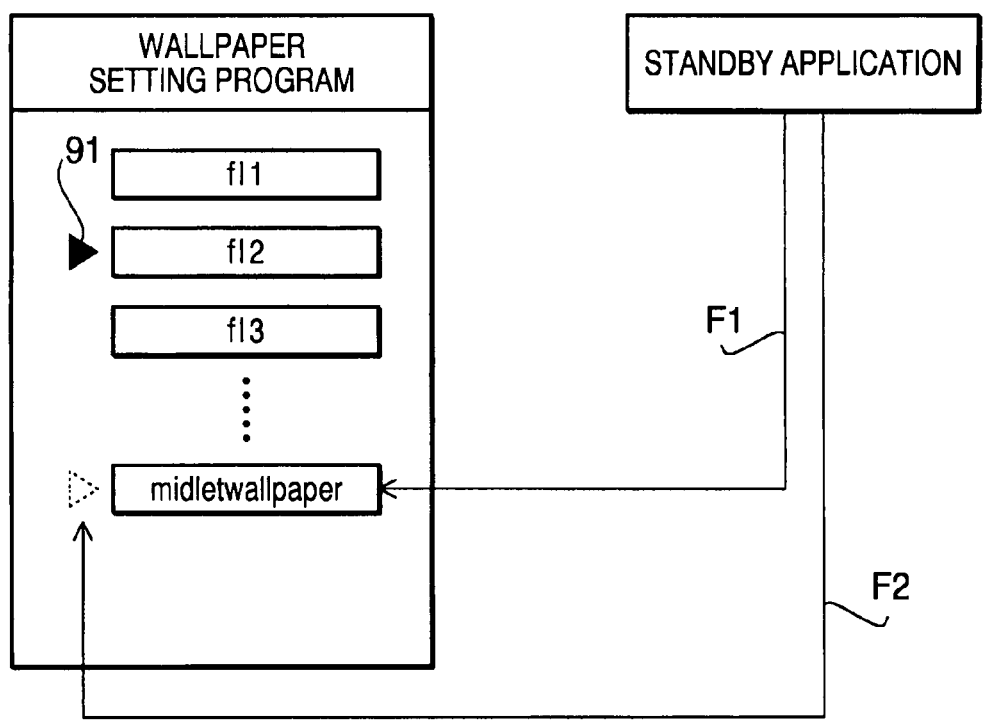
FIG. 5 is a schematic diagram showing the relationship between a standby application and a wallpaper setting program.

FIG. 5 is a schematic diagram showing the relationship between the standby application and the wallpaper setting program. As shown in FIG. 5, the wallpaper setting program has a special image file "midletwallpaper" as one of the wallpaper files. The image file "midletwallpaper" is rewritten (or newly registered) by the standby application according to the function F1. In FIG. 5, the triangular mark 91 indicates a file that has been set as the wallpaper to be displayed (the file f12 has been set as the wallpaper in the example of FIG. 5). The wallpaper setting can be changed to the midletwallpaper by the function F2 of the standby application.

The user setting application is capable of carrying out the generation of an image by the following methods, for example:

C1) Use an image that is stored in a JAR (JavaARchive) file together with the user setting application C2) Generate an image by acquiring an image file via a network C3) Generate an image by use of an image generation class which is provided as a Java execution environment By generating an image by the above image generation methods, the user setting application can set a proper image file (intended by the creator of the application) as the wallpaper (i.e. the midletwallpaper).

The user setting application may also be configured to perform the following operations in regard to the wallpaper setting when the user setting application is released from the standby application due to a user operation, etc.:

D1) Restore the wallpaper setting made by the user setting application itself to the original state (For implementing such an operation, the setting before the setting change is made by the user setting application is saved by the Java execution environment or the platform. In this case, it is unnecessary to delete the image file (midletwallpaper) that has been registered as the wallpaper.)

D2) Leave the wallpaper setting as it is

As described above, according to this embodiment, the user setting application is capable of changing settings on the wallpaper setting program's side (the default application's side). Therefore, an image intended by the creator of the user setting application can be displayed continuously on the screen even when the user setting application shifts into the paused state A2 due to an incoming telephone call, electric power saving, etc. It should be noted that the image intended by the creator of the user setting application can be retained on the screen even when the user setting application is in the paused state A2 (i.e. power saving state in which the user setting application is not actually operating).

The fact that the wallpaper setting can be set exactly according to the intention of the creator of the user setting application when the user setting application shifts into the paused state A2 due to an incoming telephone call, etc. means, from another viewpoint, that the relevance to the user setting application can be maintained in regard to the display content even when the user setting application shifts into the paused state A2 upon an incoming telephone call, electric power saving, etc. For example, assuming that the user setting application functions as a schedule book, when the schedule is changed by a user operation, the user setting application writes the state (as an image) in the wallpaper image file (midletwallpaper) and sets the wallpaper setting so as to display the midletwallpaper. With such a configuration, the latest schedule set by the user is displayed on the screen as an image even when the schedule book application shifts to the paused state due to an incoming call, etc.

Further, since the transition to the paused state can be caused by the user setting application (MIDlet) itself in MIDP as mentioned above, the electric power saving can be achieved more effectively by quickly shifting into the paused state when the editing work done on the schedule book application ends. As above, a user setting application capable of keeping on displaying an intended wallpaper while realizing the electric power saving can be created.

As described above, by the embodiment in accordance with the present invention, the user setting application is provided with the function of changing the wallpaper setting, as a software interface of the Java execution environment. Further, the Java execution environment is provided with the function of changing the wallpaper setting, as a software interface of the mobile phone platform. With this configuration, every user setting application operating on the Java execution environment is provided with the wallpaper setting function. The advantages of the embodiment described above can be implemented on any user setting application.

Incidentally, while the Java execution environment has been described in the above embodiment as an example of a specific application execution environment configured on the platform of the mobile phone terminal 10, the present invention is applicable to various types of application execution environments (e.g. BREW®) configured on the platform of a mobile communication device.

While an application execution environment which is implemented on a mobile phone terminal 10 has been described in the above embodiment, the configuration of the above embodiment is applicable to various types of mobile communication devices (e.g. PHS).

The present invention is not to be restricted to the standby application, since the displaying of the wallpaper intended by the application developer when the device shifts into the paused state for electric power saving is beneficial also for applications other than the standby application (e.g. game application).

While only one wallpaper image file "midletwallpaper" is registered from the user setting application's side in the above embodiment, two or more wallpaper image files may be registered from the user setting application's side. For example, the mobile communication device may also be configured so that multiple image files can be registered as wallpapers for multiple user setting applications, respectively. Incidentally, the images can include not only still images but also video.

What is claimed is:

1. A program stored in a memory of a mobile communication device and executed on a CPU of the mobile communication device, the program, when executed, functioning as a mobile communication device platform constructed on a mobile communication device on which a default application originally provided on the mobile communications device is operated, and an application execution environment on which a user setting application is operated, the application execution environment being configured on the mobile communication device platform,
   Wherein: the application execution environment has a function of providing a first software interface for receiving a first instruction regarding a wallpaper setting to be given to a wallpaper setting program operating, as a default application, on the mobile communication device platform, while a user setting application is operating on the application execution environment, the wallpaper setting related to a display content of the user setting application;
   the mobile communication device platform has a function of providing a second software interface for receiving a second instruction regarding the wallpaper setting from the application execution environment, the second instruction based on the first instruction;
   the application execution environment transmits the second instruction regarding the wallpaper setting to the mobile communication device platform through the second software interface in response to receiving the first instruction regarding the wallpaper setting through the first software interface;
   when the user setting application is not operated, the mobile communication device platform sets a wallpaper in accordance with a predetermined setting which is set in the wallpaper setting program operating on the mobile communication device platform; and
   a when the user setting application is operated and shifted to a paused state, the mobile communication device platform sets a wallpaper in accordance with the second instruction regarding the wallpaper setting, wherein the user setting application is shifted to a paused state in response to a notification generated upon occurrence of an event 2. The mobile communication device according to claim 1, wherein:
   the application execution environment has a function of shifting the user setting application among an active state, a paused state and an ended state, and
   the application execution environment shifts the user setting application from the active state to the paused state when the notification is generated upon occurrence of an external event, wherein the external event is an incoming call is received from the mobile communication device platform.

3. The mobile communication device according to claim 1, wherein:
   the application execution environment has a function of shifting the user setting application among an active state, a paused state and an ended state, and
   the application execution environment shifts the user setting application from the active state to the paused state when the notification is received from the user setting application for electric power saving.

4. The mobile communication device according to claim 3, wherein the first instruction regarding the wallpaper setting is issued from the user setting application when the user setting application is in the active state.

5. The mobile communication device according to claim 1, wherein the wallpaper setting includes a setting regarding registration and overwriting of an image file which is displayed as a wallpaper.

6. The mobile communication device according to claim 5, wherein the wallpaper setting includes a setting for specifying which of image files registered as wallpapers should be displayed as the wallpaper.

7. The mobile communication device according to claim 5, wherein the image file is one of a still image and a moving image.

8. The mobile communication device according to claim 1, wherein at least one selected from the mobile communication device platform and the application execution environment further has a function of saving the wallpaper before the wallpaper is changed in accordance with the second instruction regarding the wallpaper setting.

9. The mobile communication device according to claim 1, wherein the application execution environment is a Java® execution environment.

10. The mobile communication device according to claim 9, wherein the Java® execution environment is an environment in conformity with a Mobile Information Device Profile.

11. The mobile communication device according to claim 1, wherein the application execution environment is a BREW® execution environment.

12. The mobile communication device according to claim 1, wherein the application execution environment has a method to be called by the user setting application for causing the wallpaper setting program to set an image file generated by the user setting application as the wallpaper.

13. A program stored in a memory of a mobile communication device and executed on a CPU of the mobile communication device, the program, when executed, functioning as a mobile communication device platform constructed on a mobile communication device on which a default application originally provided on the mobile communications device is operated, and an application execution environment on which a user setting application is operated, the application execution environment being configured on the mobile communication device platform,
   wherein:
   the application execution environment has a function of providing a first software interface for receiving a first instruction regarding a wallpaper setting to be given to a wallpaper setting program operating, as a default application, on the mobile communication device platform, while a user setting application is operating on the application execution environment, the wallpaper setting related to a display content of the user setting application;

the mobile communication device platform has a function of providing a second software interface for receiving a second instruction regarding the wallpaper setting from the application execution environment, the second instruction based on the first instruction;

the application execution environment transmits the second instruction regarding the wallpaper setting to the mobile communication device platform through the second software interface in response to receiving the first instruction regarding the wallpaper setting through the first software interface;

when the user setting application is not operated, the mobile communication device platform sets a wallpaper in accordance with a predetermined setting which is set in the wallpaper setting program operating on the mobile communication device platform; and a when the user setting application is operated and shifted to a paused state, the mobile communication device platform sets a wallpaper in accordance with the second instruction regarding the wallpaper setting, wherein the user setting application is shifted to a paused state in response to a notification generated upon occurrence of an event.

14. The program according to claim 13, wherein: the application execution environment has a function of shifting the user setting application among an active state, a paused state and an ended state; and the application execution environment shifts the user setting application from the active state to the paused state when the notification generated upon occurrence of an external event, wherein the external event is an incoming call is received from the mobile communication device platform.

15. The program according to claim 14, wherein the instruction regarding the wallpaper setting is issued from the user setting application when the user setting application is in the active state.

16. The program according to claim 13, wherein: the application execution environment has a function of shifting the user setting application among an active state, a paused state and an ended state, and the application execution environment shifts the user setting application from the active state to the paused state when the notification is received from the user setting application for electric power saving.

17. The program according to claim 13, wherein the application execution environment is a Java® execution environment.

18. The program according to claim 17, wherein the Java® execution environment is an environment in conformity with a Mobile Information Device Profile.

19. The program according to claim 13, wherein the application execution environment is a BREW® execution environment.

20. The program according to claim 13, wherein the application execution environment has a method to be called by the user setting application for causing the wallpaper setting program to set an image file generated by the user setting application as the wallpaper.

21. A mobile communication device comprising an environment as a mobile communication device platform on which a default application originally provided on the mobile communication device is operated, and an application execution environment on which a user setting application is operated, the application execution environment being configured on the mobile communications device platform, wherein:

the application execution environment has a function of setting a wallpaper setting to be given to a wallpaper setting program, operating as a default application on the mobile communication device platform, while a user setting application is operating on the application execution environment, the wallpaper setting related to a display content of the user setting application;

when the user setting application is not operated, the mobile communication device platform sets a wallpaper in accordance with a predetermined setting which is set in the wallpaper setting program operating on the mobile communication device platform, and when the user setting application is operated and shifted to a paused state, the mobile communication device platform sets a wallpaper in accordance with a setting which is set in the user setting application operated on the application execution environment, wherein the user setting application is shifted to a paused state in response to a notification generated upon occurrence of an event.

* * * * *

UNITED STATES PATENT AND TRADEMARK OFFICE
CERTIFICATE OF CORRECTION

PATENT NO. : 7,996,044 B2
APPLICATION NO. : 11/664195
DATED : August 9, 2011
INVENTOR(S) : Yuki Hamada et al.

It is certified that error appears in the above-identified patent and that said Letters Patent is hereby corrected as shown below:

Title page, item (75) Inventors, delete "Kaoru Hagiwara, Tokyo (JP)" and insert --Kaoru Hagiwara, Kanagawa (JP)--.

Signed and Sealed this
Twentieth Day of December, 2011

David J. Kappos
*Director of the United States Patent and Trademark Office*